Figure 1:
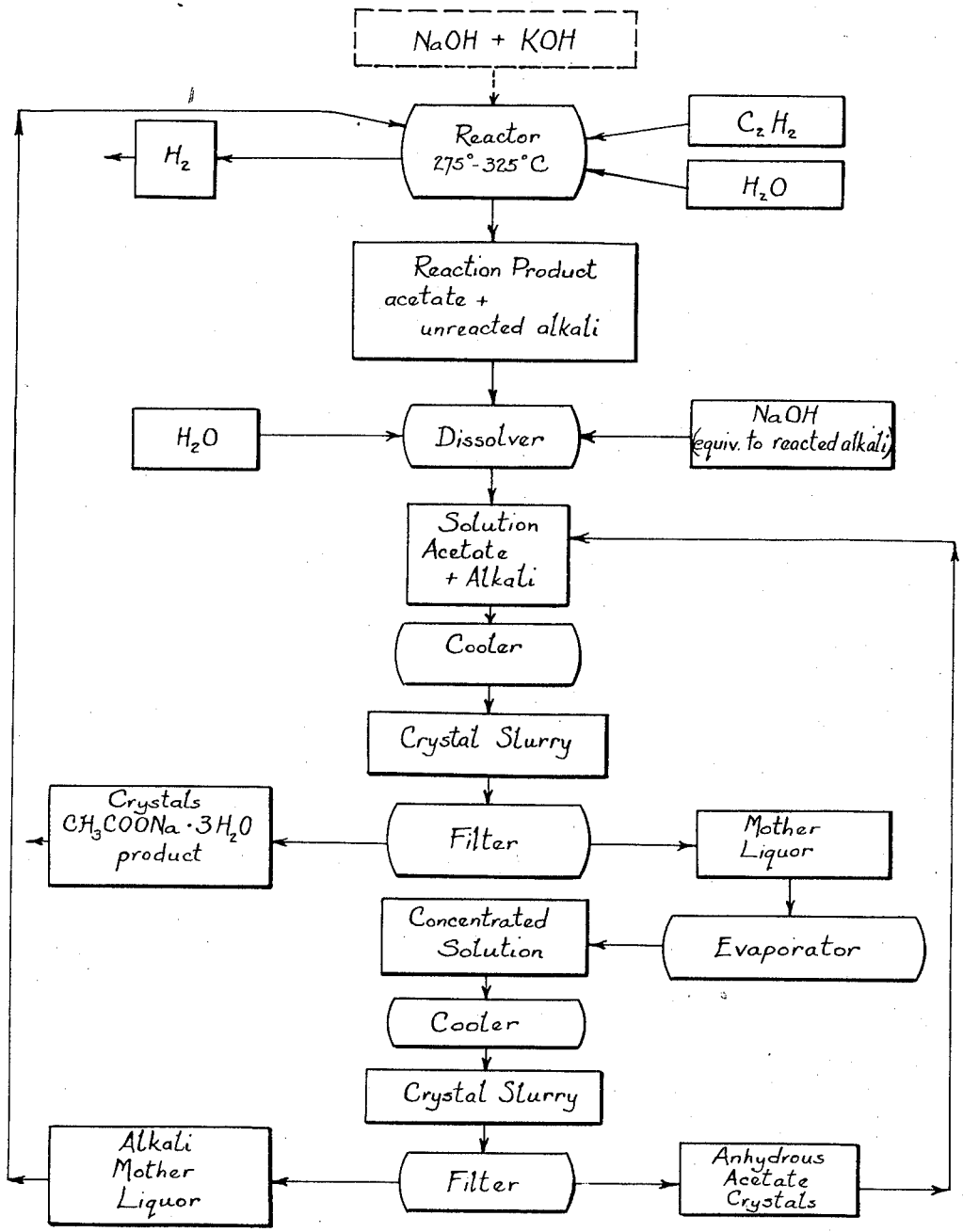

Dec. 19, 1933.  C. J. STROSACKER ET AL  1,940,611

METHOD OF SEPARATING ALKALI METAL ACETATES

Original Filed May 25, 1931

INVENTORS
Chas J. Strosacker,
BY Chester C. Kennedy and
Earl L. Pelton
Thomas Griswold, Jr.
ATTORNEY Patented Dec. 19, 1933

1,940,611

UNITED STATES PATENT OFFICE 1,940,611

METHOD OF SEPARATING ALKALI METAL ACETATES

Charles J. Strosacker, Chester C. Kennedy, and Earl L. Pelton, Midland, Mich., assignors to The Dow Chemical Company, Midland, Mich., a corporation of Michigan Original application May 25, 1931, Serial No. 539,780. Divided and this application March 21, 1932. Serial No. 600,098

4 Claims. (Cl. 260—122)

This invention relates to methods of making an alkali metal acetate by reacting an alkali metal hydroxide with acetylene and water, and has particular regard to procedure, in a method of the aforesaid character in which a mixture of sodium hydroxide and potassium hydroxide is employed, whereby the acetate product is recovered directly as sodium acetate.

In our prior application Serial No. 539,780, filed May 25, 1931, now Patent No. 1,866,329, we have described in detail and claimed the foregoing method of preparing sodium acetate, involving the use of a mixed alkali for carrying out the principal reaction. In the present application, which is a division of the aforesaid prior application, we desire to claim specifically the method of recovering sodium acetate from a solution of the reaction product containing a mixture of sodium acetate and potassium acetate together with some free alkali. The invention, then, consists of the steps in the method hereinafter fully described and particularly pointed out in the claims, the annexed drawing and following description setting forth a preferred embodiment of the invention which, however, is illustrative of but one of the various ways in which the principle of the invention may be used.

In said annexed drawing:—

The single figure is a flow sheet illustrating one preferred mode of carrying out the invention.

The general reaction here involved is shown by the following equation;—

$$MOH + C_2H_2 + H_2O \rightarrow CH_3COOM + H_2$$

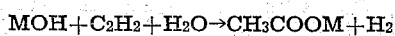

wherein M represents an alkali metal. The reaction may take place within a temperature range of 150° to 350° C. We have found that the procedure for carrying out the reaction is greatly simplified and more easily controlled if the reaction mixture is maintained in a more or less fluid or molten condition. This objective is most easily attained by using a mixture of sodium and potassium hydroxides instead of either alkali alone. An apparent disadvantage of such procedure would seem to be the formation of a mixed acetate product. We have found, however, that the process may be so regulated that sodium acetate alone, instead of a mixed acetate, may be recovered from the reaction product while potassium hydroxide is continuously recycled. The invention, therefore, provides a novel procedure for making sodium acetate wherein all the advantages inherent in the use of a mixed alkali metal hydroxide are realized without requiring theoretically the consumption of any potassium hydroxide whatever. In practice, the mechanical losses of potassium hydroxide have been found to be nearly negligible.

In carrying out our improved process a fused mixture of sodium and potassium hydroxides is provided at a temperature preferably between about 275° and 325° C., such mixture being also conveniently saturated with water at the temperature, i. e. containing approximately 10 to 20 per cent of water. Acetylene, or a mixture of acetylene and water vapor in about equal proportions by volume, is led in to the fused mass, care being taken to keep the water in the reaction equivalent to, or preferably somewhat in excess of, the acetylene introduced. The reaction mixture is advantageously stirred in order to provide contact between the gas and fresh alkali. The reaction proceeds smoothly and rapidly with an almost quantitative absorption of the acetylene.

One mode of procedure consists in continuing the reaction until the amount of acetate formed in the mixture corresponds to the sodium hydroxide originally present. The product is then dissolved in water to form a solution of suitable concentration from which sodium acetate may be crystallized directly as the trihydrated salt, $CH_3COONa.3H_2O$. The crystals are separated from the mother liquor which contains the potassium hydroxide, such mother liquor being returned to the process. A modification of the foregoing procedure is to carry on the reaction until any desired proportion of the total alkali in excess of that represented by the sodium hydroxide used is converted to acetate, then to dissolve the product in water, add sodium hydroxide to the solution in amount equivalent to the difference between the total alkali reacted and the sodium hydroxide originally taken, whereby after such addition sodium in the solution is made to correspond to the total acetate therein, and finally to crystallize out sodium acetate as the hydrated salt and separate the crystals from the mother liquor containing the potassium hydroxide.

Still another modification, which is adapted to a continuous mode of operation, consists in reacting the optimum percentage of total alkali, say 80 to 90 per cent thereof, then dissolving the product in water and adding sodium hydroxide equivalent to all the original alkali reacted. The solution is concentrated, if necessary, and then cooled to crystallize sodium acetate trihydrate therefrom. The mother liquor separated from the acetate crystals contains a mixture of sodium and potassium hydroxides in about the original amount and proportion, and is returned to the process to supply the alkali required therein. By operating thus in a continuous cycle we have found that as much as one-half of the total acetate may be crystallized out as highly pure crystals of composition $CH_3COONa.3H_2O$. The mother liquor separated from these pure crystals may be concentrated to crystallize out a further portion of the acetate, anhydrous acetate crystals being produced from the strong alkaline liquor. These anhydrous sodium acetate crystals cannot be washed free from alkali, so that they are purified by recrystallizing from water in the hydrated crystal form, which can most economically be done by adding the impure crystals to the solution of the reaction product, as hereinafter further explained. The final mother liquor containing the balance of the acetate and substantially all of the alkali is recycled in the process. In this way a constant inventory of acetate is circulated in the process, while the purified crystals of trihydrated sodium acetate separated out correspond in amount to the sodium hydroxide and acetylene reacted.

The proportions of sodium and potassium hydroxides in the mixture used for the reaction may be varied considerably, provided only that a mixture is obtained which may be maintained in fluid condition during the reaction. In general, the molecular ratio of $$\frac{NaOH}{KOH} \text{ may be between } \frac{1}{2} \text{ and } \frac{2}{1},$$

but the invention is not limited thereto.

As already stated, water is preferably introduced to the reaction in amount in excess of an equimolecular ratio to the acetylene used, so as to saturate the alkali metal hydroxide mixture at the temperature of the reaction. An excess of water introduced over that reacted and required to saturate the alkali will naturally pass off as vapor with the exit gases from the reaction. The water may be introduced either as vapor, liquid or as alkali solution, in the latter case advantageously as the mother liquor recycled as described above. It is desirable to add at least part of the water, however, as vapor along with the acetylene, for example by bubbling the latter through a body of water and leading the saturated mixture of gas and water vapor into the reaction vessel.

The following example illustrates one mode of carrying out the principal reaction with a mixed alkali, and of recovering the acetate product therefrom as trihydrated sodium acetate, according to the method claimed in the present application.

*Example*

An equimolecular mixture of sodium hydroxide and potassium hydroxide, consisting of 29 parts NaOH and 40 parts KOH, by weight, with about 13 per cent water, was melted in a closed reaction vessel and heated to a temperature of approximately 300° C. A rapid stream of acetylene was passed through a body of water at 83° to 84° C., and the saturated mixture of acetylene and water vapor, containing about 1 volume of the former to 1.2 volume of the latter, was introduced into the molten alkali with constant stirring. The reaction was continued until 85 per cent of the total hydroxides was converted to acetate. The product was dissolved in water, and 49 parts sodium hydroxide in aqueous solution, equivalent to the total alkali reacted, was added, the amount of water added being 186 parts. The hot solution was cooled to 20° C., whereby a portion of the acetate crystallized out as $CH_3COONa.3H_2O$. The crystals were filtered from the mother liquor and washed with a small amount of water, 51 parts of purified crystals of the hydrated salt being obtained, corresponding to 31 parts of anhydrous sodium acetate. The mother liquor was further concentrated to evaporate 103 parts of water, cooled to 20° C. and a precipitate of anhydrous acetate crystals was obtained, containing 32 parts $CH_3COONa$, 12 parts KOH and 18 parts $H_2O$.

In practice the latter crystals would be separated from the mother liquor and added to the solution of a succeeding batch to be recrystallized therewith, while the concentrated mother liquor, containing about 45 parts $CH_3COONa$ and most of the alkali, would be returned to the principal reaction to supply the alkali and a portion of the water therein. In continuous operation, with the proportions of materials just enumerated and with recycling of the last crystals and final mother liquor, about one-half of the total acetate would be recovered at each cycle in the first crop of pure hydrated crystals, about one-quarter of the total would be obtained as impure anhydrous acetate crystals and returned to the solution of the reaction product, and the remainder of the acetate would be returned to the principal reaction in the final mother liquor.

Referring to the drawing, the flow sheet represents the sequence of steps and movement of materials in a continuous cyclic process employing a mixture of sodium and potassium hydroxides. To start the process, a mixture of the said hydroxides in any desired proportion, e. g. an equimolecular mixture, is melted up in a suitable covered vessel provided with means for heating the same and for agitating the contents. Then acetylene and water vapor are introduced in approximately the proportion of 1 volume of the former to from 1 to 2 volumes of the latter, while actively stirring the fused reaction mixture and maintaining the same at a temperature between about 275° and about 325° C. When the reaction has been initiated, the heat developed thereby will normally be sufficient to maintain the desired temperature. The vessel is preferably to be provided with a vent to the air, so that no material pressure is built up therein and the hydrogen formed is continuously vented away. During the reaction further additions of alkali are made by returning the mother liquor from the crystallization of the acetate product in a subsequent step, as will be described hereinafter, and the introduction of fresh alkali to the vessel does not take place after the first charge, as is indicated by the dotted lines representing such initial charge.

The reaction is preferably carried to the point where from 80 to 90 per cent of the total alkali charged has been converted to acetate, whereupon the product is discharged and dissolved up in water. Advantageously a portion of the reaction mixture is always reserved in the vessel, however, as a "heel" for continuing the principal reaction. To the solution of the reaction product an amount of sodium hydroxide is added corresponding to all of the acetate formed in the reaction, or, in other words, to the difference between the total acetate in the product and that which was introduced into the principal reaction along with the alkali mother liquor. The concentration of the solution is adjusted so that the proportion of solids therein is approximately 45 to 50 per cent. The solution, which is hot due to the heat of solution of the reaction product, is cooled, conveniently to about 20° C., whereby a portion of the acetate crystallizes as the trihydrated sodium acetate, $CH_3COONa.3H_2O$. The first crop of crystals, which may consist of from 30 to 50 per cent of the total acetate, depending upon the proportion of mother liquor used in the principal reaction, is filtered and washed with a small amount of water, being thereby obtained directly in a highly pure state. The mother liquor separated from the crystals is concentrated by evaporation to remove about 35 to 40 per cent of the water therein, the concentrated solution then cooled to produce a second crop of crystals, and the latter are filtered. The last crystals, obtained from the concentrated mother liquor, are anhydrous sodium acetate, mixed with strong alkali mother liquor. These crystals are not washed but are returned directly to the dissolving step following the principal reaction, the purification thereof being combined with the working up of the reaction product. The mother liquor from the last crystals, containing most of the alkali metal hydroxide and the remainder of the acetate, is returned to the principal reaction to supply alkali thereto.

By proceeding in the manner described the product of the process consists of the first crop of relatively pure hydrated sodium acetate crystals, whereas the potassium hydroxide is continuously recycled in the mother liquor and impure second crop of crystals. Alkali is added to the process in the dissolving step, such addition consisting substantially only of sodium hydroxide, potassium hydroxide being added, if necessary, only in small amount sufficient to compensate for mechanical losses. The alkali goes through the succeeding process steps in the mother liquor, its presence therein aiding the separation of sodium acetate from the mixture of sodium and potassium compounds, and finally is introduced into the principal reaction mixture in the form of such mother liquor.

The steps of separating sodium acetate by crystallization from the mixed acetate product in themselves constitute a novel procedure not hitherto known or described. The method indeed is applicable for working up any mixture of sodium acetate and potassium acetate to recover therefrom a substantially pure sodium acetate. This may be accomplished by adding to the solution of the mixed acetates sufficient sodium hydroxide so that combined sodium therein is made to correspond in amount at least to all of the acetate present, whereupon after concentrating the solution, if necessary, to about 45 to 50 per cent total solids, sodium acetate may be crystallized as the trihydrated salt, $CH_3COONa.3H_2O$, and the crystals after filtration from the mother liquor are obtained in highly pure form, according to the procedure hereinbefore described in detail. It will be seen that the basis of the method of separation of the mixed alkali metal acetates consists in providing a solution of the acetates containing sufficient alkali metal hydroxide so that the total sodium is at least equivalent to the total acetate present, and conversely that the total potassium does not exceed the chemical equivalent of the hydroxide present. There may be an excess of sodium hydroxide, however, without interfering with the separation of the sodium acetate crystals.

Other modes of applying the principle of our invention may be employed instead of the one explained, change being made as regards the method herein disclosed, provided the step or steps stated by any of the following claims or the equivalent of such stated step or steps be employed.

We therefore particularly point out and distinctly claim as our invention:—

1. In a method of separating sodium acetate from a mixture thereof with potassium acetate, the steps which consist in dissolving the mixed acetates in water, adding sodium hydroxide in amount such that the combined sodium in the solution corresponds at least to the total acetate therein, and crystallizing sodium acetate as the trihydrate $CH_3COONa.3H_2O$ from the solution.

2. In a method of separating sodium acetate from an aqueous solution of a mixture of acetate and hydroxide of sodium and potassium, the steps which consist in adjusting the proportions of acetate and hydroxide in the solution so that the combined sodium therein corresponds in amount at least to the acetate and the potassium is not in excess of the chemical equivalent of the hydroxide, and crystallizing sodium acetate as the trihydrate $CH_3COONa.3H_2O$ from the solution.

3. In a method of making sodium acetate wherein an aqueous solution of a mixture of acetate and hydroxide of sodium and potassium is obtained, the steps for the separation of acetate therefrom which consist in adding sufficient sodium hydroxide to make the sodium present in the solution at least equivalent to the total acetate therein, and crystallizing sodium acetate as the trihydrate $CH_3COONa.3H_2O$ from the solution.

4. In a method of making sodium acetate, wherein an aqueous solution of a mixture of acetate and hydroxide of sodium and potassium is obtained, the steps for the separation of acetate therefrom which consist in adding sodium hydroxide in amount equivalent to the total acetate present, concentrating the solution to a content of from 45 to 50 per cent total solids, and crystallizing sodium acetate as the trihydrate $CH_3COONa.3H_2O$ from the solution.

CHARLES J. STROSACKER.
CHESTER C. KENNEDY.
EARL L. PELTON.